(12) United States Patent
Galzin et al.

(10) Patent No.: US 11,912,417 B2
(45) Date of Patent: Feb. 27, 2024

(54) AIR CONDITIONING SYSTEM WITH CABIN AIR RECOVERY

(71) Applicant: LIEBHERR-AEROSPACE TOULOUSE SAS, Toulouse (FR)

(72) Inventors: Guillaume Galzin, Toulouse (FR); Cedric Boye, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 272 days.

(21) Appl. No.: 17/629,915

(22) PCT Filed: Jul. 24, 2020

(86) PCT No.: PCT/FR2020/051357
§ 371 (c)(1),
(2) Date: Jan. 25, 2022

(87) PCT Pub. No.: WO2021/014106
PCT Pub. Date: Jan. 28, 2021

(65) Prior Publication Data
US 2022/0250753 A1 Aug. 11, 2022

(30) Foreign Application Priority Data
Jul. 25, 2019 (FR) ...................................... 1908460

(51) Int. Cl.
*B64D 13/08* (2006.01)
*F25B 9/00* (2006.01)
*B64D 13/06* (2006.01)

(52) U.S. Cl.
CPC ............. *B64D 13/08* (2013.01); *F25B 9/004* (2013.01); *B64D 2013/0618* (2013.01);
(Continued)

(58) Field of Classification Search
CPC ............. B64D 13/08; B54D 2013/618; B54D 2013/644; B54D 2013/648; B54D 2013/662; B54D 2013/688; F25B 9/004
(Continued)

(56) References Cited

U.S. PATENT DOCUMENTS 6,128,909 A * 10/2000 Jonqueres .............. B64D 13/06
62/93
10,450,074 B2 * 10/2019 Stieger .................... F01D 15/10

FOREIGN PATENT DOCUMENTS

EP 3254970 A1 12/2017
EP 3342709 A1 7/2018
(Continued)

*Primary Examiner* — Joel M Attey
(74) *Attorney, Agent, or Firm* — CRGO Global; Steven M. Greenberg

(57) ABSTRACT

Air conditioning system for an aircraft cabin, comprising a primary exchanger (14) configured to cool bleed air (12) from at least one compressor of the aircraft, a pre-compressor (18), an intermediate exchanger (20), a main compressor (22) configured to compress said pre-compressed bleed air, a main exchanger (28) configured to cool the compressed bleed air, and a water extraction loop, characterized in that it comprises a duct (108) for recovering at least part of the air from the cabin after it has passed through the cabin, and recovered air circulation ducts configured so that the recovered air successively passes through:
a secondary exchanger (34), the recovered air forming a first cold source for cooling the bleed air again,
a heat exchanger (20), the recovered air forming a second cold source for cooling the bleed air,
an energy recovery turbine (48), the recovered air forming a source of energy.

8 Claims, 2 Drawing Sheets

(52) U.S. Cl.
CPC ............... *B64D 2013/0644* (2013.01); *B64D 2013/0648* (2013.01); *B64D 2013/0662* (2013.01); *B64D 2013/0688* (2013.01)

(58) Field of Classification Search
USPC .......................................................... 62/87
See application file for complete search history.

(56) References Cited

FOREIGN PATENT DOCUMENTS

EP           3401223 A1    11/2018
EP           3421364 A1    1/2019

* cited by examiner

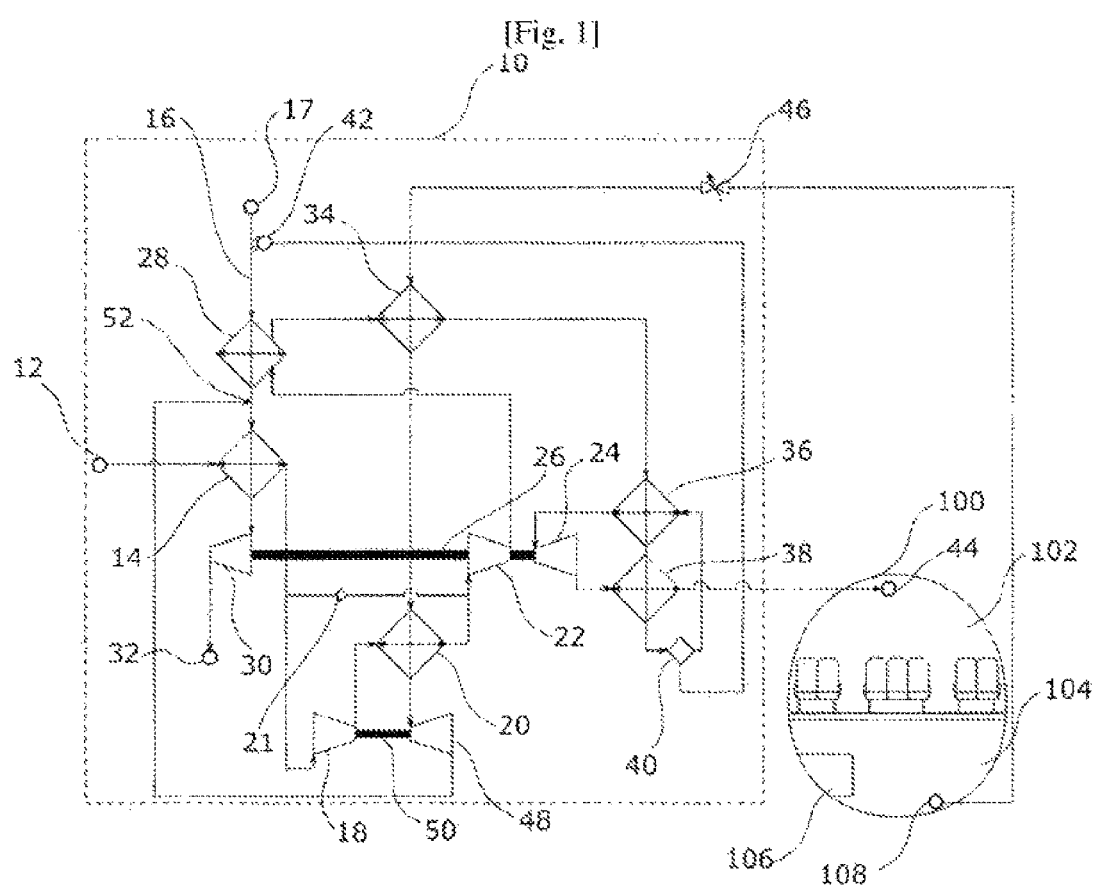

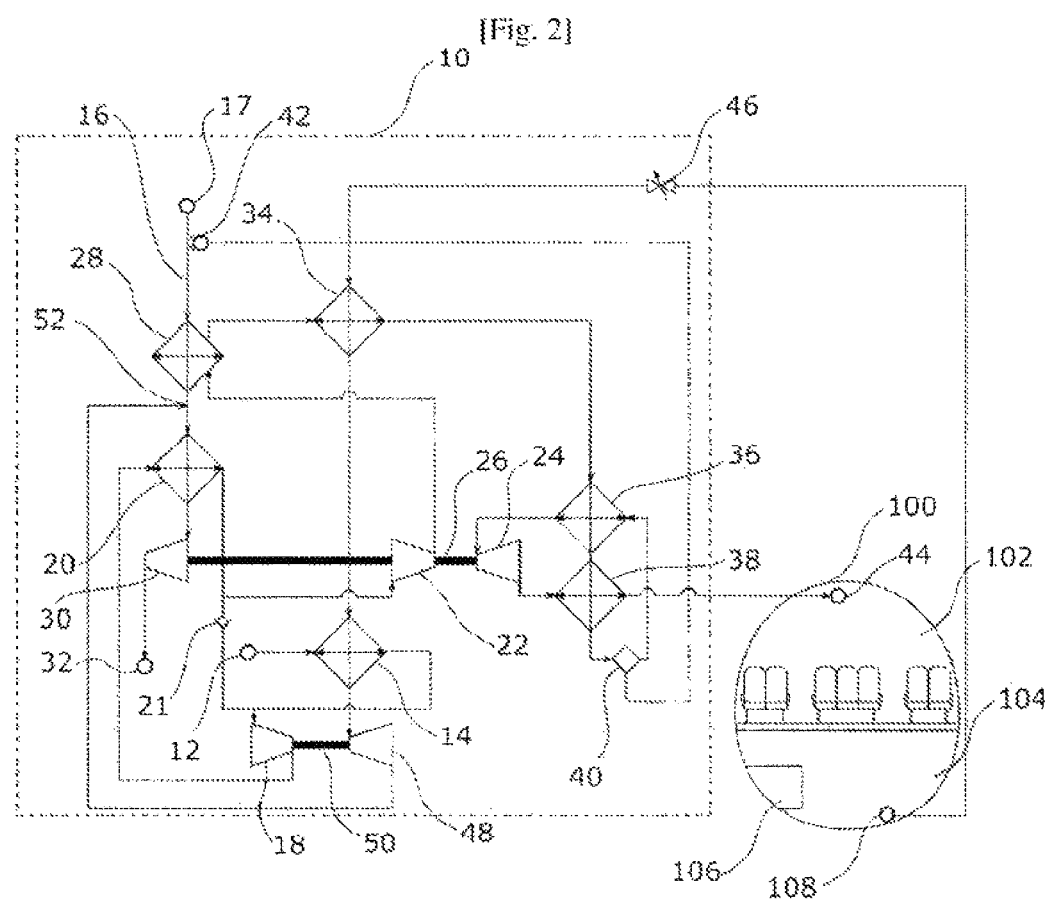

AIR CONDITIONING SYSTEM WITH CABIN AIR RECOVERY

CROSS-REFERENCE TO RELATED APPLICATIONS

This application is a § 371 national phase entry of International Application No. PCT/FR2020/051357, filed Jul. 24, 2020, which claims priority to French Patent Application No. 1908460, filed Jul. 25, 2019.

TECHNICAL FIELD OF THE INVENTION

The invention relates to an air conditioning system having an energy and cooling capacity recovery system. In particular, the invention relates to an air conditioning system for an aircraft cabin, which air conditioning system has a system for recovering energy and cooling capacity from air that has circulated in the cabin.

TECHNOLOGICAL BACKGROUND

In an aircraft, the air conditioning system allows the air intended in particular to supply the cabin of the aircraft to be treated. Air treatment consists in particular in adjusting the temperature, pressure, humidity, etc. of air from an air source of the aircraft, for example air bled from the engines, which is usually referred to as bleed air.

Throughout the text, the term "cabin" denotes any interior space of an aircraft in which the pressure and/or temperature of the air needs to be controlled. This may be a cabin for passengers, the pilot's cockpit, a hold, and in general any area of the aircraft that requires air at a controlled pressure and/or temperature.

In a subsonic aircraft, the ram air used for cooling can come in particular from the outside air, the temperature of which when in contact with the aircraft fuselage (referred to as the skin temperature) is low (at most 0° C.), which facilitates air conditioning.

In a supersonic aircraft, the high speed of the aircraft when said aircraft is in supersonic flight causes a significant increase in the skin temperature, which can reach 52° C. at Mach 1.4, 78° C. at Mach 1.6, and 140° C. at Mach 2.0. The ram air is therefore at a higher temperature.

The air conditioning system of a supersonic aircraft therefore requires a significantly higher cooling capacity than that of a subsonic aircraft. Cooling capacity is the capacity of a fluid to act as a cold source for cooling another, hotter fluid.

The current solutions consist in using the fuel oil from the aircraft as a cold source. Other solutions propose the use of a refrigerant fluid circuit.

These solutions result in a more complex air conditioning system because it is necessary to use an external fluid, such as fuel oil or a refrigerant fluid.

The inventors have sought to use a new source of cooling capacity in the air conditioning system, which is in particular for use in a supersonic aircraft.

Aims of the Invention

The invention aims to provide an air conditioning system that allows an additional cold source to be provided.

The invention aims in particular to provide, in at least one embodiment, an optimized air conditioning system for a supersonic aircraft, in particular during the supersonic phases of flights.

The invention also aims to provide, in at least one embodiment of the invention, an air conditioning system that allows energy to be recovered from the cabin air.

DISCLOSURE OF THE INVENTION

To this end, the invention relates to an air conditioning system for an aircraft cabin, comprising:
- a primary exchanger configured to cool bleed air from at least one compressor of the aircraft,
- a pre-compressor configured to pre-compress the cooled bleed air,
- an intermediate exchanger configured to cool the pre-compressed air from the pre-compressor,
- a main compressor configured to receive said pre-compressed bleed air cooled by the intermediate exchanger and compress said air,
- a main exchanger configured to cool the compressed bleed air by means of ram air taken from outside the aircraft, and
- a water extraction loop that includes a main turbine and is configured to extract water from the cooled, compressed bleed air and supply the cabin of the aircraft, characterized in that it comprises a duct for recovering at least part of the air from the cabin after it has passed through the cabin, and recovered air circulation ducts configured so that the recovered air successively passes through:
- a secondary exchanger, the recovered air forming a first cold source in said secondary exchanger for cooling the bleed air again downstream of the main exchanger and upstream of the water extraction loop,
- a heat exchanger, the recovered air forming a second cold source in said heat exchanger for cooling the bleed air upstream or downstream of the pre-compressor, the heat exchanger either being formed by the intermediate exchanger, with the ram air forming a cold source of the primary exchanger, or being formed by the primary exchanger, with the ram air forming a cold source of the intermediate exchanger,
- an energy recovery turbine, the recovered air forming a source of energy after passing through the secondary exchanger and then the heat exchanger.

An air conditioning system according to the invention therefore makes it possible to overcome several defects in the prior art by recovering the air from the cabin.

Firstly, the air recovered from the cabin is used as the first cold source in the secondary exchanger to cool the bleed air downstream of the main exchanger. In other words, the secondary exchanger comprises two air circuits: a cold air circuit supplied by the air recovered from the cabin, and a hot air circuit supplied by the bleed air after it has passed through the main exchanger.

In the main exchanger, the cold source is formed by ram air from the outside. This ram air, taken from outside the aircraft, is much hotter in supersonic flight than in supersonic flight and therefore has less cooling capacity.

The cooling downstream of the main exchanger improves the cooling of the air intended to supply the cabin.

Secondly, the air recovered from the cabin acts as a second cold source either upstream (in the primary exchanger) or downstream (in the intermediate exchanger) of the pre-compressor. The pre-compressor is used to pre-compress the bleed air so as to maximize the efficiency of the main compressor: two-stage compression allows the efficiency of the pre-compressor and the compressor to be maximized, each operating within a different inlet pressure range. Whichever of the primary exchanger and the intermediate exchanger is not supplied by the air recovered from the cabin has the ram air as a cold source.

In other words, the primary exchanger comprises two air circuits: a cold air circuit supplied by the air recovered from the cabin or the ram air, and a hot air circuit supplied by the bleed air. The intermediate exchanger likewise comprises two air circuits: a cold air circuit supplied by the air recovered from the cabin or the ram air, and a hot air circuit supplied by the bleed air after it has passed through the pre-compressor.

When the bleed air is pre-compressed, its temperature increases. The use of the air recovered from the cabin thus makes it possible either to reduce the bleed temperature before the pre-compression or to reduce the temperature after the pre-compression.

Thirdly, the air recovered from the cabin forms a source of energy by passing through an energy recovery turbine, where it is expanded. The energy recovered by the turbine is thus used to power any other energy consumer of the aircraft.

Recovering energy is particularly advantageous because the use of the recovered air as the first cold source and then as the second cold source allows a significant increase in its temperature, which increases the energy recovery capacity. In particular, the bleed air upstream or downstream of the pre-compressor is at a high temperature and the recovered air is heated significantly when it acts as the second cold source.

The design of the air conditioning system according to the invention is therefore optimized so that the recovered air acts as a source of cooling capacity both as the first cold source and as the second cold source, and so that the substantial increase in the temperature resulting from this use as a cold source is recovered by an energy recovery turbine.

Moreover, the air conditioning system obtained is simpler and more reliable than systems that use fuel oil or only a refrigerant fluid circuit as a source of cooling capacity. Cabin air, sometimes called stale air after it has circulated in the cabin, is a particularly advantageous source of cooling capacity and energy recovery because it is available in the aircraft.

Although the air conditioning system performs particularly well for an aircraft capable of supersonic flights, it can also be used for an aircraft that only makes subsonic flights.

Advantageously and according to the invention, the energy recovery turbine is mechanically connected to the pre-compressor by a transmission shaft such that the energy recovered by the energy recovery turbine is transmitted to the pre-compressor.

According to this aspect of the invention, the energy recovery allows the pre-compressor to be powered, which optimizes the air conditioning system. The substantial energy recovery allows efficient pre-compression of the air upstream of the main compressor, thus allowing a high expansion rate at the main turbine to increase the cooling capacity of the air conditioning system.

The pre-compression also makes it possible to treat the same air flow with a smaller main compressor and thus reduce the overall bulk of the air conditioning system.

Advantageously and according to the invention, the recovered air circulation ducts are configured so that, upon exiting the energy recovery turbine, at least part of the recovered air is discharged into a channel, referred to as a ram air circulation channel, in which ram air circulates.

According to this aspect of the invention, the air leaving the energy recovery turbine, which is cooled upon exiting the turbine, can be used to supply the channel in which the ram air circulates in order to reduce the temperature of the ram air.

Advantageously and according to the latter variant of the invention, said part of the air discharged into said ram air circulation channel is discharged downstream of the passage of ram air through the main exchanger and upstream of the passage of the ram air through the primary exchanger or the intermediate exchanger.

According to this aspect of the invention, the discharge of the air leaving the energy recovery turbine into the ram air circulation channel between the main exchanger and the primary exchanger makes it possible to optimize the air conditioning system because the air leaving the energy recovery turbine has a pressure that is closer to the ram air pressure upon exiting the main exchanger than upon entering the main exchanger.

In particular, this makes it possible to reduce the amount of air taken from outside the aircraft to form this ram air. Reducing this amount of air taken makes it possible to reduce the drag of the aircraft, which has a very significant impact, particularly in supersonic flight.

Reducing the temperature before the passage through the primary exchanger allows a clear increase in performance.

The mixture of the air leaving the energy recovery turbine and the ram air between the two exchangers limits the impact on the bleed air flow.

Advantageously and according to the invention, the recovered air circulation ducts are configured so that, upon exiting the energy recovery turbine, at least part of the recovered air is meant for cooling a high-temperature circuit of the aircraft.

According to this aspect of the invention, the air cooled upon exiting the energy recovery turbine can act as a cooling source for any high-temperature circuit requiring cooling, for example cooling of an engine oil circuit, etc.

Advantageously and according to the invention, the air supplied by at least one compressor of the aircraft is supplied by at least one compressor of an engine of the aircraft.

According to this aspect of the invention, the engine of the aircraft is a propulsion engine of the aircraft or an auxiliary power unit, for example. Aircraft engines generally comprise a compressor in order to operate and can therefore supply directly compressed air to the air conditioning system.

Advantageously and according to the invention, the air supplied by at least one compressor of the aircraft is supplied by a compressor powered by an electric motor.

According to this aspect of the invention, the air is supplied by a compressor actuated by an electric motor, for example if the air conditioning system is used in a "more electric" aircraft in which the energy is mainly transmitted between systems electrically. The compressor is supplied by outside air, for example, and compresses said air.

The invention also relates to an aircraft comprising a cabin and an air conditioning system according to the invention configured to supply the cabin with conditioned air.

The invention also relates to an air conditioning system and an aircraft that are characterized in combination by all or some of the features mentioned above or below.

LIST OF DRAWINGS

Further aims, features, and advantages of the invention can be found in the following description, which is provided solely by way of non-limiting example, and which refers to the accompanying drawings, in which:

FIG. 1 is a schematic view of an air conditioning system according to a first embodiment of the invention.

FIG. 2 is a schematic view of an air conditioning system according to a second embodiment of the invention.

DETAILED DESCRIPTION OF AN EMBODIMENT OF THE INVENTION

For the sake of illustration and clarity, the drawings do not strictly adhere to scales and proportions.

Moreover, identical, similar, or analogous elements are denoted by the same reference signs in all the drawings.

FIGS. 1 and 2 show an air conditioning system 10 according to a first embodiment of the invention and a second embodiment of the invention, respectively.

The air conditioning system 10 provides cooling and air conditioning for a cabin 100 of an aircraft during the flight of said aircraft.

The air conditioning system 10 is intended to use air from at least one compressor of the aircraft, for example at least one compressor of at least one engine of the aircraft (not shown), referred to as bleed air 12, and to condition this air so as to supply the cabin 100.

For this purpose, the air conditioning system 10 comprises a set of ducts which allow the bleed air 12 to be guided to the cabin 100 while carrying out various conditioning treatments.

First, the bleed air 12 passes through a primary exchanger 14 in order to be cooled.

The cooled bleed air leaving the primary exchanger 14 is then pre-compressed in a pre-compressor 18.

Downstream of this pre-compressor, the pre-compressed bleed air passes through an intermediate exchanger 20 in order to be cooled again. The intermediate exchanger and the pre-compressor can be bypassed via a bypass valve 21, depending on the flight phases, if pre-compression is not necessary.

The pre-compressed and cooled bleed air is then compressed in a main compressor 22.

In these embodiments, the main compressor 22 forms part of a turbomachine comprising said main compressor 22, which is connected to a main turbine 24 by a main shaft 26. According to other embodiments, it is possible for the main compressor 22 and the main turbine 24 not to be connected. In particular, the main turbine 24 can form a turbo-engine together with the pre-compressor 18, for example.

The compressed bleed air then passes through a main exchanger 28 supplied with ram air 16 taken from outside the aircraft through an inlet 17.

The ram air 16 is set in motion by a fan 30 driven by the shaft of the turbomachine. The air is then discharged to the outside 32.

The bleed air leaving the main exchanger 28 passes through a secondary exchanger 34 to be cooled again.

Upon exiting this secondary exchanger 34, the bleed air passes through a water extraction loop comprising a first loop exchanger 36 and a second loop exchanger 38, the main turbine 24, and a water extractor 40. The water recovered from the water extractor can be injected into the ram air channel by a water injector 42.

The air leaving the water extraction loop is thus conditioned, i.e. to an acceptable temperature, pressure, and humidity, and is transmitted to the cabin of the aircraft via an inlet 44 for conditioned air.

The conditioned air is generally first supplied to a first part 102 of the cabin that accommodates the passengers. The air then circulates in a second part 104 of the cabin, which forms the hold, for example, and may contain electrical equipment 106, for example.

At least part of the air that has passed through the cabin is recovered by a cabin air recovery duct 108 to be reused in the air conditioning system via recovered air circulation ducts. For example, the cabin air is generally at approximately 25° C. in the first part 102 of the cabin, and at approximately 39° C. after circulating in the second part 104 of the cabin in nominal operation.

Of course, air from the cabin can also leak to the outside due to the pressurization of the cabin, or be deliberately discharged to the outside by a valve (not shown), if necessary.

The volume of recovered air in the cabin is adjusted by an adjustable valve 46.

The recovered air forms a first cold source for the secondary exchanger 34 so as to cool the bleed air upon its exit from the main exchanger 28. The use of this recovered air makes it possible to compensate for the fact that the ram air is relatively hot in supersonic flight conditions in comparison with subsonic flight conditions. For example, the recovered air is at approximately 72° C. upon exiting the secondary exchanger 34 in nominal operation.

Upon exiting the secondary exchanger 34, the recovered air is used as a second cold source in a heat exchanger.

According to the first embodiment of the invention shown in FIG. 1, the recovered air leaving the secondary exchanger 34 forms a second cold source in the intermediate exchanger 20, i.e. the heat exchanger is formed by the intermediate exchanger 20. The primary exchanger 14 is supplied with ram air 16 downstream of the passage of said ram air 16 through the main exchanger 28.

The recovered air entering at approximately 72° C., for example, exits at approximately 183° C. in nominal operation; the bleed air passing through the intermediate exchanger 20 goes from approximately 244° C. (upon exiting the pre-compressor) to approximately 170° C.

According to the first embodiment of the invention shown in FIG. 2, the recovered air leaving the secondary exchanger 34 forms a second cold source in the primary exchanger 14, i.e. the heat exchanger is formed by the primary exchanger 14. The intermediate exchanger 20 is supplied with ram air 16 downstream of the passage of said ram air 16 through the main exchanger 28.

After passing through the secondary exchanger 34 and the intermediate exchanger 20 in the first embodiment, or the primary exchanger 14 in the second embodiment, the recovered air is heated and thus forms a source of energy which is utilized by passing through an energy recovery turbine 48. The energy recovery turbine 48 can transmit the recovered energy to the pre-compressor 18 via an energy recovery shaft 50, for example. The recovered air leaving the energy recovery turbine 48 is at approximately 68° C. in nominal operation, for example.

Upon exiting the energy recovery turbine, the recovered air can be discharged through an opening 52 directly into the ram air circulation channel. In this embodiment, the opening 52 is configured so that the recovered air is discharged downstream of the main exchanger 28 and upstream of the primary exchanger 14 in the first embodiment described with reference to FIG. 1, and upstream of the intermediate exchanger 20 in the second embodiment described with reference to FIG. 2.

The invention claimed is:

1. An air conditioning system for an aircraft cabin, comprising:
   a primary exchanger configured to cool bleed air from at least one compressor of the aircraft,
   a pre-compressor configured to pre-compress the cooled bleed air,
   an intermediate exchanger configured to cool the pre-compressed air from the pre-compressor,
   a main compressor configured to receive said pre-compressed bleed air cooled by the intermediate exchanger and compress said air,
   a main exchanger configured to cool the compressed bleed air by means of rain air taken from outside the aircraft, and
   a water extraction loop that includes a main turbine and is configured to extract water from the cooled, compressed bleed air and supply the cabin of the aircraft, and
   a duct for recovering at least part of the air from the cabin after it has passed through the cabin, and recovered air circulation ducts configured so that the recovered air successively passes through each of a:
   a secondary exchanger, the recovered air forming a first cold source in said secondary exchanger for cooling the bleed air again downstream of the main exchanger and upstream of the water extraction loop,
   a heat exchanger, the recovered air forming a second cold source in said heat exchanger for cooling the bleed air upstream or downstream of the pre-compressor, the heat exchanger either being formed by the intermediate exchanger, with the rain air forming a cold source of the primary exchanger, or being formed by the primary exchanger, with the rain air forming a cold source of the intermediate exchanger,
   an energy recovery turbine, the recovered air forming a source of energy after passing through the secondary exchanger and then the heat exchanger.

2. The air conditioning system according to claim 1, wherein the energy recovery turbine is mechanically connected to the pre-compressor by a transmission shaft such that the energy recovered by the energy recovery turbine is transmitted to the pre-compressor.

3. The air conditioning system according to claim 1, wherein the recovered air circulation ducts are configured so that, upon exiting the energy recovery turbine, at least part of the recovered air is discharged into a channel, referred to as a rain air circulation channel, in which rain air circulates.

4. The air conditioning system according to claim 3, wherein said part of the air discharged into said rain air circulation channel is discharged downstream of the passage of rain air through the main exchanger and upstream of the passage of rain air through the primary exchanger or the intermediate exchanger.

5. The air conditioning system according to claim 1, wherein the recovered air circulation ducts are configured so that, upon exiting the energy recovery turbine, at least part of the recovered air is intended for cooling a high-temperature circuit of the aircraft.

6. The air conditioning system according to claim 1, wherein the air supplied by at least one compressor of the aircraft is supplied by at least one compressor of an engine of the aircraft.

7. The air conditioning system according to claim 1, wherein the air supplied by at least one compressor of the aircraft is supplied by a compressor actuated by an electric motor.

8. An aircraft comprising:
   a cabin; and
   an air conditioning system configured to supply the cabin with conditioned air, the system comprising:
   a primary exchanger configured to cool bleed air from at least one compressor of the aircraft,
   a pre-compressor configured to pre-compress the cooled bleed air,
   an intermediate exchanger configured to cool the pre-compressed air from the pre-compressor,
   a main compressor configured to receive said pre-compressed bleed air cooled by the intermediate exchanger and compress said air,
   a main exchanger configured to cool the compressed bleed air by means of rain air taken from outside the aircraft, and
   a water extraction loop that includes a main turbine and is configured to extract water from the cooled, compressed bleed air and supply the cabin of the aircraft, and
   a duct for recovering at least part of the air from the cabin after it has passed through the cabin, and recovered air circulation ducts configured so that the recovered air successively passes through each of a:
   a secondary exchanger, the recovered air forming a first cold source in said secondary exchanger for cooling the bleed air again downstream of the main exchanger and upstream of the water extraction loop,
   a heat exchanger, the recovered air forming a second cold source in said heat exchanger for cooling the bleed air upstream or downstream of the pre-compressor, the heat exchanger either being formed by the intermediate exchanger, with the rain air forming a cold source of the primary exchanger, or being formed by the primary exchanger, with the rain air forming a cold source of the intermediate exchanger,
   an energy recovery turbine, the recovered air forming a source of energy after passing through the secondary exchanger and then the heat exchanger.

* * * * *